(12) United States Patent
Luong (10) Patent No.: US 11,200,187 B2
(45) Date of Patent: Dec. 14, 2021

(54) CONFIGURING PROGRAMMATIC INTERFACES OF BUS BRIDGES IN COMPUTER SYSTEMS

(71) Applicant: DELL PRODUCTS L.P., Round Rock, TX (US)

(72) Inventor: Anh Dinh Luong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/366,070

(22) Filed: Mar. 27, 2019

(65) Prior Publication Data
US 2020/0311005 A1 Oct. 1, 2020

(51) Int. Cl.
*G06F 13/40* (2006.01)
*G06F 13/42* (2006.01)
*G06F 13/10* (2006.01)

(52) U.S. Cl.
CPC ...... *G06F 13/4027* (2013.01); *G06F 13/4221* (2013.01)

(58) Field of Classification Search
USPC .............. 710/3, 300, 306, 312–314; 370/402
See application file for complete search history.

(56) References Cited

U.S. PATENT DOCUMENTS

| | | | | |
|---|---|---|---|---|
| 6,883,081 B2* | 4/2005 | Lanzatella | ............ | G06F 3/0605 707/999.001 |
| 6,996,658 B2* | 2/2006 | Brocco | ................. | G06F 13/404 710/312 |
| 7,979,592 B1* | 7/2011 | Pettey | ................... | G06F 13/404 709/205 |
| 8,036,102 B2* | 10/2011 | Jain | ........................ | H04L 12/462 370/216 |
| 8,909,843 B1* | 12/2014 | Choi | ..................... | G06F 13/385 710/314 |
| 2003/0079075 A1* | 4/2003 | Asseline | ............ | G06F 13/4027 710/315 |
| 2004/0109195 A1* | 6/2004 | Davis | .................. | G06F 13/4027 358/1.15 |
| 2005/0010736 A1 | 1/2005 | Qureshi et al. | | |
| 2005/0076122 A1* | 4/2005 | Khawand | .............. | H04L 69/329 709/226 |
| 2007/0174617 A1* | 7/2007 | Carrel | ................ | H04N 21/6543 713/168 |
| 2008/0222338 A1* | 9/2008 | Balasubramanian | ........ | G06F 9/5061 710/306 |
| 2009/0077297 A1* | 3/2009 | Zhao | ..................... | G06F 9/5011 710/314 |

(Continued)

Primary Examiner — Idriss N Alrobaye
Assistant Examiner — Henry W Yu
(74) Attorney, Agent, or Firm — Joseph Mencher (57) ABSTRACT

Software bus bridges (410.*xy*) are ordered in an order of associated bus identifiers (B), to allow programs accessing the corresponding physical bridges (310.*xy*) to find the correct software bus bridge either based on the bus identifiers, in which case the particular ordering of software bridges is unimportant, or based on the order of the software bridges. In some cases, this facilitates software porting across platforms with similar programmatic interfaces to the physical bridges but with different bus identifier ranges associated with physical bridges or with programmatic interfaces. A procedure is provided for determining the correct software bridge from a bus identifier. Other embodiments are also provided.

20 Claims, 7 Drawing Sheets

(56) References Cited

U.S. PATENT DOCUMENTS

| | | | |
|---|---|---|---|
| 2011/0205078 A1* | 8/2011 | Hua | G06F 11/321 340/691.1 |
| 2013/0152075 A1* | 6/2013 | Cardona | G06F 9/45558 718/1 |
| 2016/0248640 A1* | 8/2016 | Simoncelli | H04L 67/16 |
| 2016/0267035 A1* | 9/2016 | Murphy | G06F 13/368 |
| 2016/0292423 A1 | 10/2016 | Yao et al. | |
| 2017/0337064 A1 | 11/2017 | Vidyadhara et al. | |
| 2019/0068772 A1 | 2/2019 | Lo et al. | |
| 2020/0167181 A1* | 5/2020 | Tsirkin | G06F 13/4221 |

\* cited by examiner

| | |
|---|---|
| 410.00 | PCI root bridge 310.00 path 310H.00 |
| | EFI_PCI_ROOT_BRIDGE_PROTOCOL 310P.00<br>B range: 0 to 0x1F |
| 410.01 | PCI root bridge 310.00 path 310H.01 |
| | EFI_PCI_ROOT_BRIDGE_PROTOCOL 310P.01<br>B range: 0x20 to 0x3F |
| 410.02 | PCI root bridge 310.00 path 310H.02 |
| | EFI_PCI_ROOT_BRIDGE_PROTOCOL 310P.02<br>B range: 0x40 to 0x5F |
| 410.03 | PCI root bridge 310.00 path 310H.03 |
| | EFI_PCI_ROOT_BRIDGE_PROTOCOL 310P.03<br>B range: 0x60 to 0x7F |
| 410.10 | PCI root bridge 310.00 path 310H.10 |
| | EFI_PCI_ROOT_BRIDGE_PROTOCOL 310P.10<br>B range: 0x80 to 0x9F |
| 410.11 | PCI root bridge 310.00 path 310H.11 |
| | EFI_PCI_ROOT_BRIDGE_PROTOCOL 310P.11<br>B range: 0xA0 to 0xBF |
| 410.12 | PCI root bridge 310.00 path 310H.12 |
| | EFI_PCI_ROOT_BRIDGE_PROTOCOL 310P.12<br>B range: 0xC0 to 0xDF |
| 410.13 | PCI root bridge 310.00 path 310H.13 |
| | EFI_PCI_ROOT_BRIDGE_PROTOCOL 310P.13<br>B range: 0xE0 to 0xFF |

| | |
|---|---|
| 410.00 | PCI root bridge 310.00 path  310H.00 |
|        | EFI_PCI_ROOT_BRIDGE_PROTOCOL 310P.00<br>B range: 0x60 to 0x7F |
| 410.01 | PCI root bridge 310.00 path  310H.01 |
|        | EFI_PCI_ROOT_BRIDGE_PROTOCOL 310P.01<br>B range: 0x40 to 0x5F |
| 410.02 | PCI root bridge 310.00 path  310H.02 |
|        | EFI_PCI_ROOT_BRIDGE_PROTOCOL 310P.02<br>B range: 0x20 to 0x3F |
| 410.03 | PCI root bridge 310.00 path  310H.03 |
|        | EFI_PCI_ROOT_BRIDGE_PROTOCOL 310P.03<br>B range: 0 to 0x1F |
| 410.10 | PCI root bridge 310.00 path  310H.10 |
|        | EFI_PCI_ROOT_BRIDGE_PROTOCOL 310P.10<br>B range: 0xE0 to 0xFF |
| 410.11 | PCI root bridge 310.00 path  310H.11 |
|        | EFI_PCI_ROOT_BRIDGE_PROTOCOL 310P.11<br>B range: 0xC0 to 0xDF |
| 410.12 | PCI root bridge 310.00 path  310H.12 |
|        | EFI_PCI_ROOT_BRIDGE_PROTOCOL 310P.12<br>B range: 0xA0 to 0xBF |
| 410.13 | PCI root bridge 310.00 path  310H.13 |
|        | EFI_PCI_ROOT_BRIDGE_PROTOCOL 310P.13<br>B range: 0x80 to 0x9F |

CONFIGURING PROGRAMMATIC INTERFACES OF BUS BRIDGES IN COMPUTER SYSTEMS

BACKGROUND

The present disclosure relates to computer systems, and more particularly accessing devices via bus bridges in computer systems.

Figure 1:
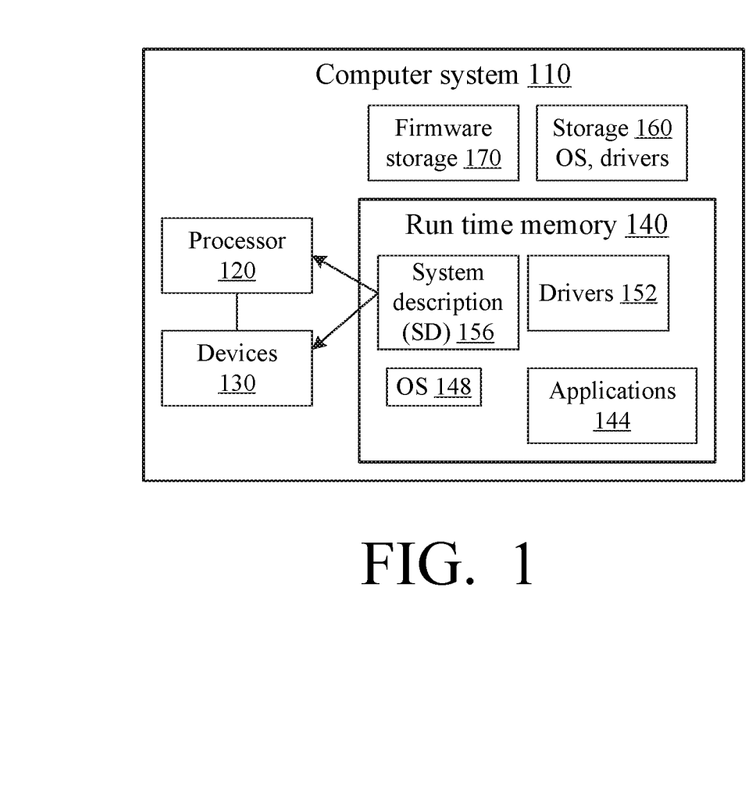
FIG. 1 is a schematic view illustrating an example of a computer system.

FIG. 1 illustrates a computer system 110 having one or more computer processors 120 and one or more other devices 130. Devices 130 may be other processors, computer storage devices (disks or volatile or non-volatile semiconductor memory), video cards, network interface cards, or any other kinds of devices that communicate with the processor, and combinations of the above. Processor 120 executes computer programs having their instructions and data stored in run-time memory 140. The computer programs may include application programs 144 (such as a word processor, a browser, etc.) and operating system (OS) 148. In addition, memory 140 holds drivers 152, which are programs used to access the devices 130. Memory 140 may include dynamic random access memory (DRAM) or static random access memory (SRAM) for example.

An interface between processor 120 and devices 130 may vary from one system 110 to another, but OS 148 and applications 144 can run on different systems 110 with minimal adaptation thanks to System Description (SD) data 156. SD 156 describes the devices 130, and in particular describes programmatic interfaces to devices 130, including hardware-defined features of programmatic interfaces. The programmatic interfaces include instruction parameters and/or register values and/or other values available to the OS and the applications as needed to access the devices 130.

Memory 140 may be a volatile memory, which is erased when powered down. When the system is powered up again, OS 148 and drivers 152 are loaded from a separate, non-volatile storage 160, possibly magnetic or semiconductor or optical memory or some other kind of storage.

Before loading OS 148, the system 110 is initialized by firmware programs stored in a non-volatile storage 170. Storage 170 may include a flash memory, e.g. Serial Peripheral Interface (SPI) flash memory, or some other kind of storage. The firmware may include programs such as BIOS (Basic Input-Output System), UEFI (Unified Extensible Firmware Interface), ACPI (Advanced Configuration and Power Interface) tables, and/or other programs.

Figure 2:
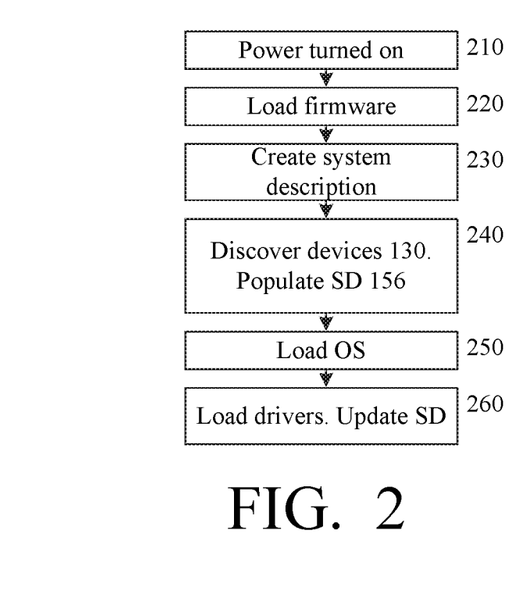
FIG. 2 is a flowchart of an exemplary computer system initialization process.

FIG. 2 illustrates operation of system 110 on power-up. At step 210, the power is turned on. At step 220, firmware (e.g. BIOS or UEFI) is loaded from memory 170 to memory 140, and begins execution. At step 230, the firmware creates some system description tables in SD memory area 156. These tables may include, for example, a Differentiated System Description Table (DSDT) based on ACPI specification, or a built-in chipset table, or some other kind of table. Also at step 230, such tables may be populated with information on some of the devices 130. Specifically, some information on some of the devices 130 may be stored in memory 170 as part of the firmware. (In UEFI terminology, such devices are called "host controllers".)

At step 240, the firmware discovers devices 130 (including devices other than host controllers), and updates SD 156 accordingly.

At step 250, OS 148 is loaded from storage 160. At step 260, the OS scans SD 156 to identify, and load from storage 160, drivers 152 for devices 130. Some of the drivers may be loaded in earlier steps, possibly before the OS loading step 250. SD 156 is updated as appropriate.

Computer system 110 can be a simple system, e.g. a desktop computer, or can be a complex system with many devices 130 interconnected by multiple buses, e.g. if system 110 is a data center server. An exemplary bus system is PCI (Peripheral Component Interconnect), illustrated in FIG. 3. The devices 130 include PCI host bridges 310.0, 310.1, which couple the processor 120 to respective PCI host buses 320.0, 320.1. Each PCI host bus 320.$x$ (i.e. 320.0 or 320.1) is connected to a set of PCI root bridges 310.$xy$. In particular, host bus 320.0 is connected to root bridges 310.00, 310.01, 310.02, 310.03. Host bus 320.1 is connected to root bridges 310.10, 310.11, 310.12, 310.13. Each root bridge 310.$xy$ is a root of a tree topology of buses and other devices. In particular, each root bridge 310.$xy$ couples the host bus 320.$x$ to buses 324, which are connected to PCI devices. For example, root bridge 310.02 is connected to downstream buses 324 connected to devices 330.1, 330.2, 330.3, 330.4. Device 330.4 is a PCI bridge connected to other buses 324 which in turn are connected to a device 330.5 and possibly other devices.

Figure 3:
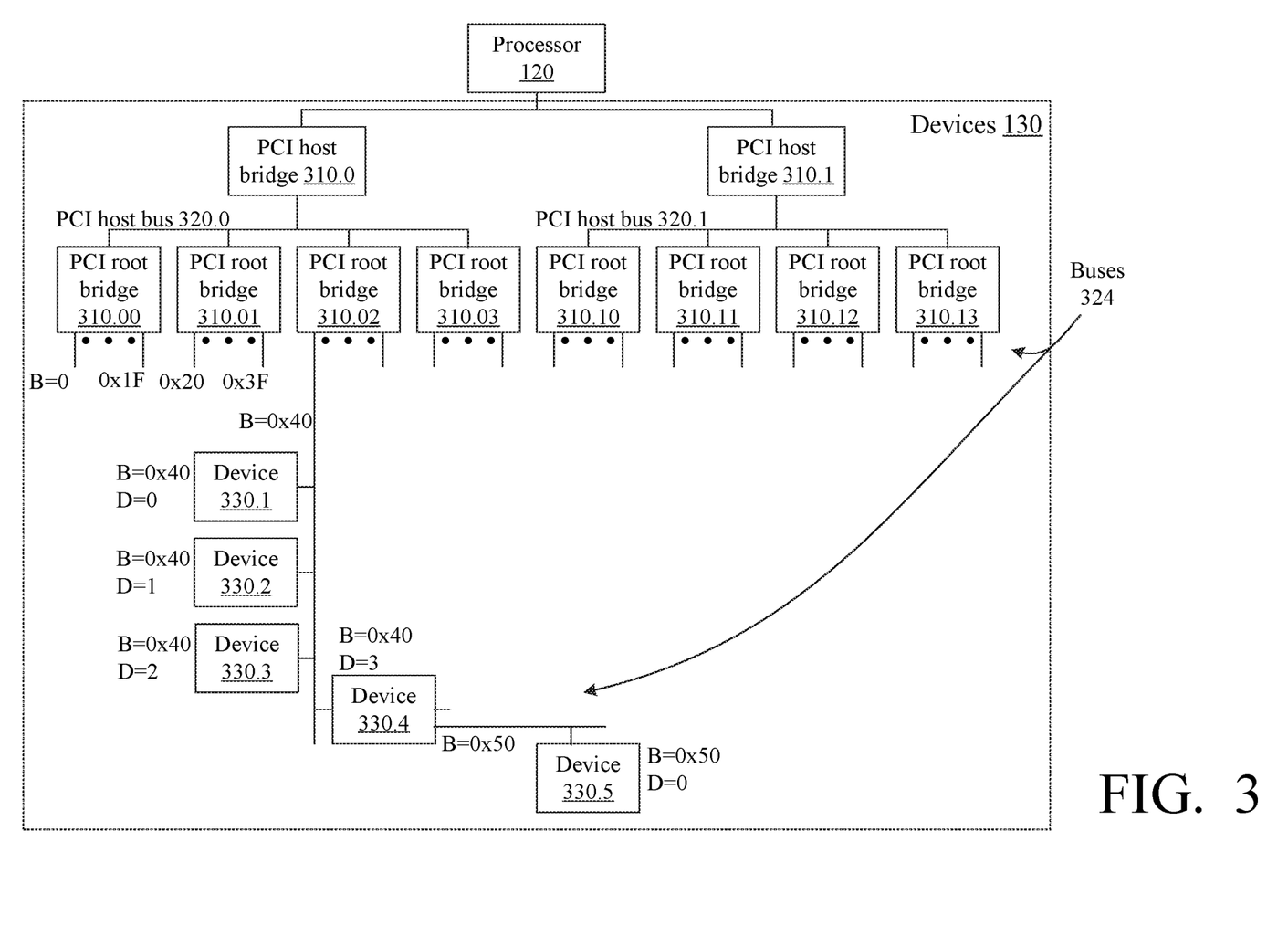
FIG. 3 is a schematic view illustrating an example of a computer system.

In some systems, host bridges 310.$x$ and root bridges 310.$xy$ are host controllers, recorded in firmware 170 and at least partly described in SD 156 at step 230. Devices 330 are discovered at step 240.

In some examples, processor 120, PCI host bridges 310.$x$, and root bridges 310.$xy$ are installed on a motherboard which also includes memory/storage modules 140, 160, 170. At least some of buses 324 and other devices may be on other boards, and may be connected to root bridges 310.$xy$ via suitable connectors.

In PCI and PCIe (PCI Express), each device 330 is identified by two numbers: bus number (B), and device number (D). In addition, a device may specify a function number (F) to be used in specifying a particular function when accessing the device. A combination of B, D, and F is sometimes abbreviated as BDF. The bus number B identifies the bus 324 to which the device is connected. The bus numbers B can be assigned by firmware at steps 230, 240. In the example of FIG. 3, devices 330.1, 330.2, 330.3, 330.4 are connected to bus number 0x40 (i.e. 40 hexadecimal), so their B number is 0x40. Devices 330.1, 330.2, 330.3, 330.4 are assigned the D values of 0, 1, 2, and 3 respectively. (The D values are assigned based on the device position along the bus.) The buses extending from bridge 330.4 include a bus 0x50 Device 330.5 has B=0x50, and D=0.

The PCI specifications (https://pcisig.com/specifications) allow arbitrary bus number assignments. However, the bus number assignments in a given system 110 must be consistent with the hardware interconnection between the devices 130 and processor 120, and specifically with the corresponding programmatic interfaces. In some computer systems, each PCI root bridge 310.$xy$ is limited to a specific range of bus numbers.

For example, processor 120 may be a multi-chip module (MCM), code-named "Naples" (Trademark) of processor family "family 17h" (Trademark) available from AMD (Advanced Micro Devices, Inc.) of the United States of America. The processor may be manufactured in 8 chips, with each chip including processor circuitry and, in addition, including one of root bridges 310.$xy$. The chips may be mounted in two motherboard sockets (4 chips per socket). The processor hardware assumes a certain bus number range for each bridge 310.$xy$ based on the bridge's socket position, e.g.: root bridge 330.00 must be associated with the B range of 0 to 0x1F inclusive; bridge 330.01 with the B range of 0x20 to 0x3F inclusive; bridge 330.02 with the B range of 0x40 to 0x5F inclusive; bridge 330.03 with the B range of 0x60 to 0x7F inclusive; bridge 330.10 with the B range of 0x80 to 0x9F inclusive; bridge 330.11 with the B range of 0xA0 to 0xBF inclusive; bridge 330.12 with the B range of 0xC0 to 0xDF inclusive; and bridge 330.13 with the B range of 0xE0 to 0xFF inclusive. The bus ranges are described in SD 156.

Figure 4:
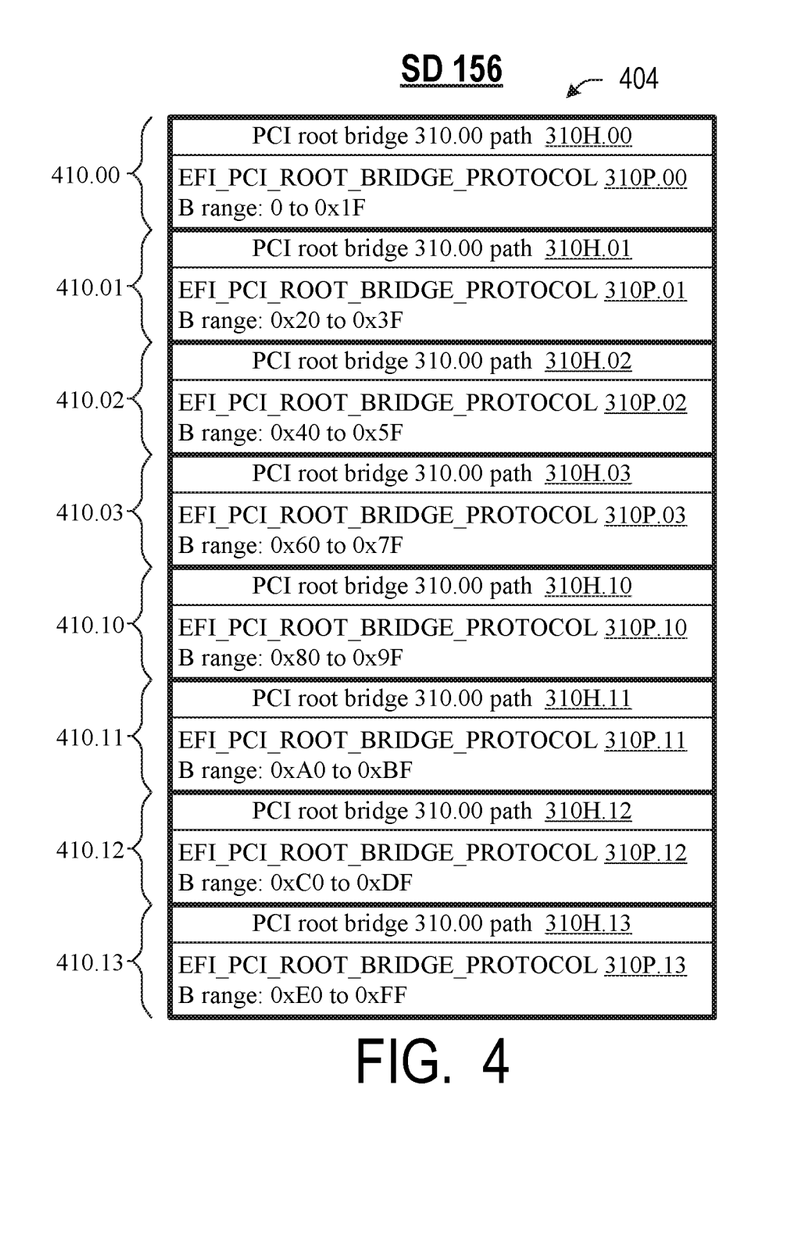
FIG. 4 is a schematic view of an exemplary memory structure formed in an exemplary computer system initialization process.

FIG. 4 illustrates a root bridge description table 404 created in SD 156 at step 230. The data 410.xy for each root bridge 310.xy is called a "handle" or a "software bridge". Each handle 410.xy includes a device path 310H.xy describing the programmatic interface for the root bridge based on how the root bridge is hardwired to the processor. The handle also includes the corresponding protocol 310P.xy, called EFI_PCI_ROOT_BRIDGE_PROTOCOL, containing pertinent data and pointers to the corresponding driver 152. Among other things, the protocol 310P.xy specifies the bus number range. There are 8 PCI root bridges, and corresponding 8 instances of protocol 310P.

It is desirable to facilitate software design needed to access the devices 130, and facilitate software adaptation to different systems 110.

SUMMARY

Some embodiments of the present invention relate to software design techniques facilitating adaptation to new processors or processor/device interconnections. In particular, in some embodiments, the software is structured to minimize the modifications required for such adaptation.

DETAILED DESCRIPTION

This section describes some embodiments of the present invention. The invention is not limited to such embodiments except as defined by the appended claims.

For purposes of this disclosure, a computer system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a computer system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The computer system may include random access memory (RAM), one or more processing resources such as a central processing unit (CPU) or hardware or software control logic, ROM, and/or other types of nonvolatile memory. Additional components of the computer system may include one or more disk drives, one or more network ports for communicating with external devices as well as various input and output (I/O) devices, such as a keyboard, a mouse, touchscreen and/or a video display. The computer system may also include one or more buses operable to transmit communications between the various hardware components.

Figure 5:
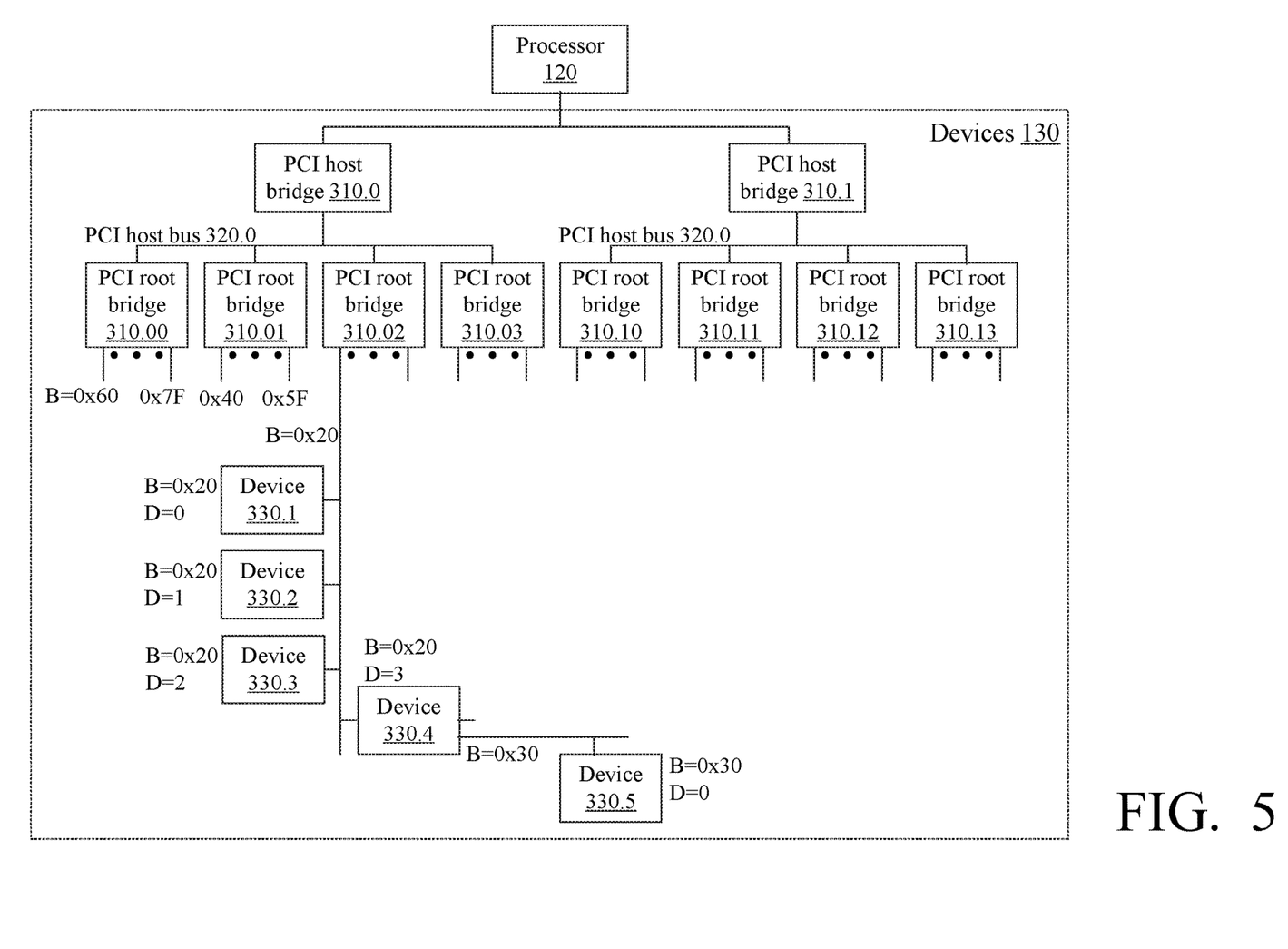
FIG. 5 is a schematic view illustrating an example of a computer system.

Some features of computer systems will now be described on the example of FIGS. 3 and 4 for a system using an AMD "Naples" processor. AMD also issued a processor of type "Rome" (Trademark), which is similar in some respects to Naples, and has the same programmatic interface for the PCI root bridges except that Rome requires different bus number ranges. An exemplary Rome-based system 110 is illustrated in FIG. 5, which is identical to FIG. 3 except for the bus numbers B. Assuming that each root bridge 310.xy of FIG. 5 corresponds to the root bridge 310.xy of FIG. 3 (i.e. the two root bridges have the same device path 310H.xy), the beginning bus numbers of each range in FIG. 5, in the order of the "xy" parameters, are: 0x60, 0x40, 0x20, 0, 0xE0, 0xC0, 0xA0, 0x80. In other words, in Rome, the bus ranges are as shown in the following table:

| "xy" parameter for root bridge 310.xy | B number range |
| --- | --- |
| 00 | 0x60 to 0x7F |
| 01 | 0x40 to 0x5F |
| 02 | 0x20 to 0x3F |
| 03 | 0 to 0x1F |
| 10 | 0xE0 to 0FF |
| 11 | 0xC0 to 0xDF |
| 12 | 0xA0 to 0xBF |
| 13 | 0x80 to 0x9F |

Due to the different bus number ranges, the Naples software may work incorrectly in the Rome scheme, and may have to be changed. Some embodiments of the present invention simplify adapting the Naples software so as to provide software that would work on both kinds of systems.

Figure 6:
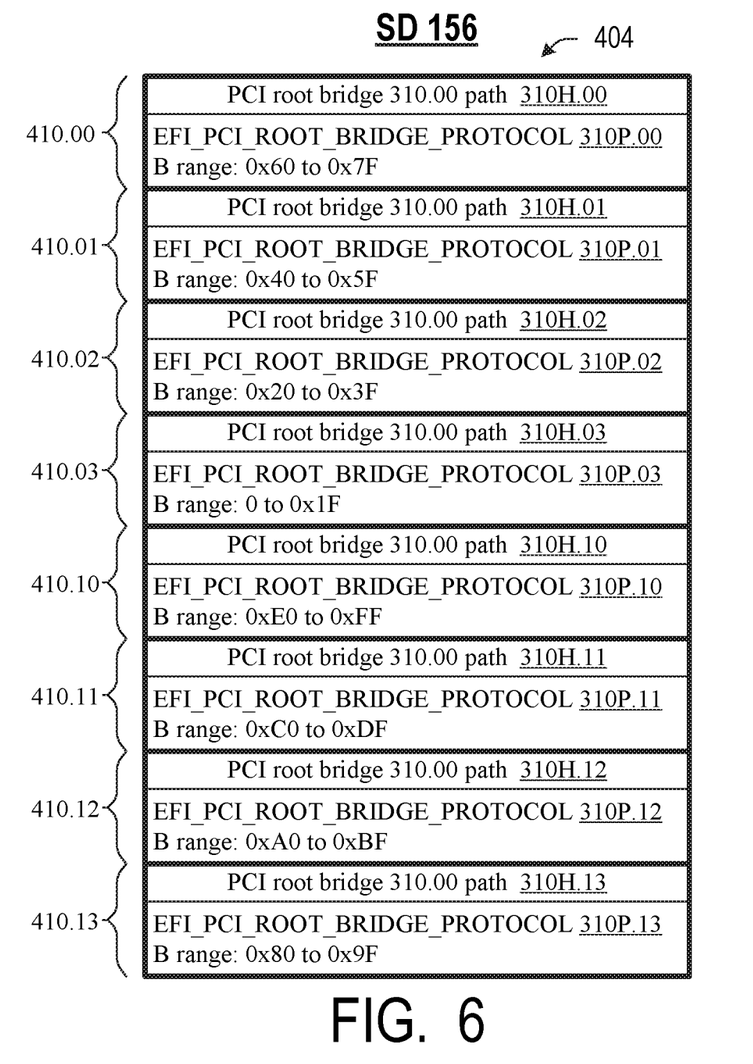
FIGS. 6 and 7 are schematic views of exemplary memory structures formed in exemplary computer system initialization processes.

Specifically, referring to FIG. 4, software access to the PCI devices depends on the correct bus number ranges in handles 410 of table 404. FIG. 6 shows a table 404 identical to FIG. 4 except that the bus ranges are set for Rome. To access a device 130 with a known BDF, the software may search the table 404 based on the B number to determine the proper programmatic interface to the device. The inventor has observed that in searching the table 404, some software programs check the bus number ranges in protocols 310P, and such programs will work with either Naples or Rome. However, other software programs do not check the bus number ranges, but assume a bus number range based on the handle position (sequential handle order) in table 404. Since FIGS. 4 and 6 have different bus number ranges for a handle in any given table position, such programs would not work in both Naples and Rome.

Figure 7:
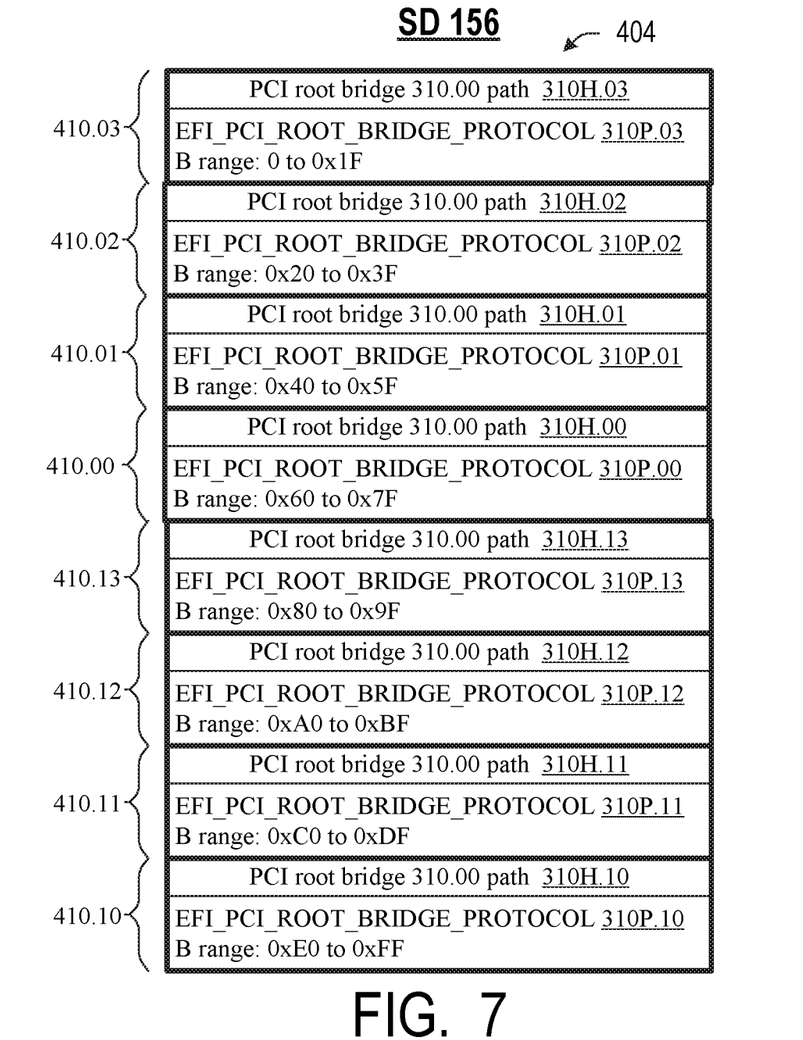

The inventor further observed that the handle order in FIG. 4 is the ascending order of bus numbers. Therefore, in some embodiments of the Rome system, the handles 410 are arranged in the ascending order of the bus numbers. FIG. 7 illustrates such table 404. In FIG. 7, each device path 310H.xy can be identical to the path 310H.xy in FIG. 4.

However, the handle order of FIG. 7 allows both types of software to work properly: both the software checking the bus number ranges when searching the table 404, and the software assuming a bus number range from the handle order, will work correctly.

The term "order" (or "sequential order") may be defined in any appropriate way depending on the searching method for handle 410. For example, the ascending order may be the increasing order of addresses in memory 140 if the table is searched in the increasing memory address order, or may be the order of handles in a linked list if the handles 410 are arranged and searched based on a linked list. (In a linked list, each subsequent handle's location is defined by a pointed in the immediately preceding handle.) If the searching algorithm (and the ordering) in FIG. 7 are the same as in FIG. 4, then both kinds of software will work on either Naples or Rome.

Figure 8:
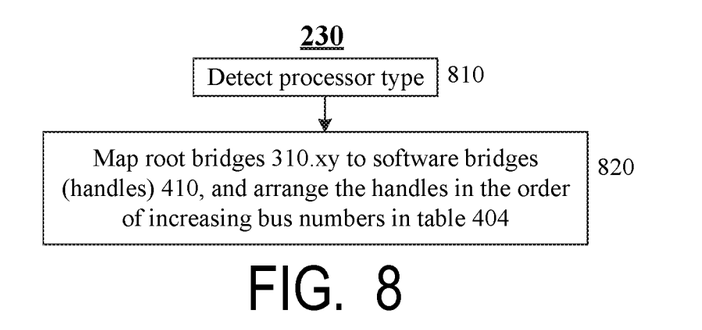
FIGS. 8 and 9 are flowcharts of exemplary computer system initialization processes.

FIG. 8 illustrates operations performed by firmware at step 230 according to some embodiments of the present invention. At step 810, the program of step 230 checks (by reading a predefined processor register for example) whether the processor is of type Naples or Rome. At step 820, the program 230 maps the physical bridges 310.xy to software bridges 410.xy, and arranges the handles in SD 156 (table 404) in the order of bus range numbers based on the results of step 810, to form the table 404 of FIG. 4 for Naples, and the table 404 of FIG. 6 for Rome.

The invention is not limited to the Naples or Rome processors, nor to only two different processor or system types. Also, step 810 may conduct any checking needed to determine a mapping between the physical bridges 310.xy and handles 410.xy. Step 820 then builds the table 404 with the handles in the ascending bridge number order.

Figure 9:
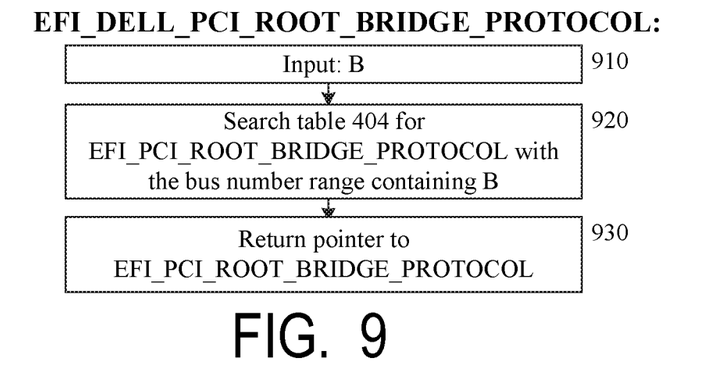

FIG. 9 illustrates a protocol EFI_DELL_PCI_ROOT_BRIDGE_PROTOCOL installed in some embodiments at step 230. This protocol is a procedure that accepts a bus number B (step 910), and searches the table 404 for the bus number range containing B (step 920). The procedure returns a pointer to, or other identification of, handle 410.xy or its protocol EFI_PCI_ROOT_BRIDGE_PROTOCOL having the bus range containing B. This procedure can be called by software that needs to access the EFI_DELL_PCI_ROOT_BRIDGE_PROTOCOL, e.g. to access a device 130 based on the BDF address.

The invention is not limited to any particular processor or system architecture, and in particular to the number of root bridges or to other particulars. Processor 120 can be a microprocessor or a multichip module (MCM). For example, a Rome processor is an 8-chip MCM designed for installation in two sockets, with each socket containing four of the chips; the root bridges are on two separate IO chips, each IO chip having four root bridges. Other processor or system architectures are possible.

Some embodiments of the present invention are defined by the following numbered clauses.

Clause 1 defines a method for operating a computer system comprising one or more computer processors (e.g. 120) and a plurality of bus bridges (e.g. root bridges 130.xy), the method comprising:

determining, by the computer system, a type of the computer system (e.g. at step 810; this may be a processor type, like Naples or Rome, or some other parameter defining the bus number ranges for each bridge), each type associating each said bus bridge with a set of bus identifiers (e.g. B numbers) which are identifiers of buses accessible via the bus bridge; and creating in a computer storage (e.g. in SD 156 or some other computer-accessible storage), by the computer system, a sequence of software bridges (e.g. 410.xy), each software bridge specifying at least part of a programmatic interface (e.g. 310H.xy and/or 310P.xy) for accessing an associated one of the bus bridges, the programmatic interface being dependent on hardware interconnection between the associated bus bridge and the one or more computer processors, each software bridge specifying the associated set of bus identifiers;

wherein in the sequence of software bridges, the software bridges are in a sequential order corresponding to an order of the associated sets of bus identifiers, the sequential order depending on said type of the computer system. (Thus, the sets of bus identifiers are ordered; each set can be a range of numbers, and the sets may be ordered by the minimum number in each range. The ranges may or may not overlap. Other types of sets or orderings are possible.)

2. The method of clause 1, wherein each bus bridge is a PCI (Peripheral Component Interconnect) root bridge.

3. The method of clause 1 or 2, further comprising the computer system repeatedly:

(i) receiving a bus identifier, and (ii) searching the computer storage for the corresponding software bridge whose associated set of bus identifiers includes the bus identifier received in the corresponding operation (i);

wherein at least one instance of operation (ii) comprises matching the corresponding received bus identifier against one or more bus identifier sets specified by one or more software bridges; and wherein at least one other instance of operation (ii) does not match the corresponding received bus identifier against any bus identifier set specified by any software bridge, but determines the corresponding software bridge from the corresponding received bus identifier defining a position of the corresponding software bridge in said sequence.

4. The method of any preceding clause, further comprising the computer system repeatedly:

(i) receiving a bus identifier, and (ii) searching the computer storage for the corresponding software bridge whose associated set of bus identifiers includes the bus identifier received in the corresponding operation (i);

wherein at least one instance of operation (ii) determines the corresponding software bridge using the corresponding received bus identifier defining a position of the corresponding software bridge in said sequence; and wherein at least one other instance of operation (ii) determines the corresponding software bridge by traversing the software bridges to match the corresponding received bus identifier against the bus identifier set of each software bridge traversed until the bus identifier set includes the corresponding received bus identifier.

5. The method of any preceding clause, wherein the sets of bus identifiers do not overlap.

6. The method of any preceding clause, wherein each set of bus identifiers is a range of integers.

7. The method of any preceding clause, wherein the sequential order is an increasing or decreasing order of addresses in the computer storage.

8. The method of any preceding clause, wherein the sequential order is an order of the software bridges in a linked list of the software bridges.

The invention includes a computer system comprising a software procedure (e.g. EFI_DELL_PCI_ROOT_BRIDGE_PROTOCOL) which receives a bus identifier, and outputs an identification of (e.g. a pointer to) a software bus bridge specifying the associated set of bus identifiers to which the bus identifier belongs.

The invention also includes computer systems configured to perform methods described above, e.g. programmed to perform such methods. The invention includes non-transitory computer readable medium with computer programs operable to perform methods described above when executed by computer systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising operating a computer system comprising one or more computer processors, a computer storage, and a plurality of bus bridges, the bus bridges corresponding to hardware interconnection parameters defined, for each bus bridge, by hardware interconnection between the bus bridge and the one or more computer processors, wherein operating the computer system comprises:
   determining, by the computer system, a processor type which is a type of at least one of the one or more computer processors, each processor type associating each said bus bridge with a maximum set of bus identifiers available for use as identifiers of buses accessible via the bus bridge, the maximum set being independent of buses actually present in the computer system and accessible via the bus bridge, wherein for at least one hardware interconnection parameter and the corresponding bus bridge, the associated maximum set of bus identifiers depends on the processor type; and
   creating in the computer storage, by the computer system, a sequence of software bridges, each software bridge specifying at least part of a programmatic interface for accessing an associated one of the bus bridges, the programmatic interface being dependent on the hardware interconnection between the associated bus bridge and the one or more computer processors, each software bridge specifying the associated maximum set of bus identifiers;
   wherein in the sequence of software bridges, the software bridges are in a sequential order corresponding to an order of the associated maximum sets of bus identifiers which is independent of the processor type, but a corresponding order of the associated hardware interconnection parameters depends on said processor type.

2. The method of claim 1, wherein each bus bridge is a PCI (Peripheral Component Interconnect) root bridge.

3. The method of claim 1, further comprising the computer system repeatedly:
   (i) receiving a bus identifier, and
   (ii) searching the computer storage for the corresponding software bridge whose associated set of bus identifiers includes the bus identifier received in the corresponding operation (i);
   wherein at least one instance of operation (ii) comprises matching the corresponding received bus identifier against one or more bus identifier sets specified by one or more software bridges; and
   wherein at least one other instance of operation (ii) does not match the corresponding received bus identifier against any bus identifier set specified by any software bridge, but determines the corresponding software bridge from the corresponding received bus identifier defining a position of the corresponding software bridge in said sequence.

4. The method of claim 1, further comprising the computer system repeatedly:
   (i) receiving a bus identifier, and
   (ii) searching the computer storage for the corresponding software bridge whose associated set of bus identifiers includes the bus identifier received in the corresponding operation (i);
   wherein at least one instance of operation (ii) determines the corresponding software bridge using the corresponding received bus identifier defining a position of the corresponding software bridge in said sequence; and
   wherein at least one other instance of operation (ii) determines the corresponding software bridge by traversing the software bridges to match the corresponding received bus identifier against the bus identifier set of each software bridge traversed until the bus identifier set includes the corresponding received bus identifier.

5. The method of claim 1, wherein the sets of bus identifiers do not overlap.

6. The method of claim 1, wherein each set of bus identifiers is a range of integers; and
   at least one bus bridge is part of a chip comprising at least one other bus bridge and/or circuitry of the processor.

7. The method of claim 1, wherein the sequential order of the software bridges corresponds to an increasing or decreasing order of addresses in the computer storage.

8. The method of claim 1, wherein the sequential order of the software bridges is an order of the software bridges in a linked list of the software bridges.

9. A computer system comprising one or more computer processors, a computer storage, and a plurality of bus bridges corresponding to hardware interconnection parameters defined, for each bus bridge, by hardware interconnection between the bus bridge and the one or more computer processors, the computer system being configured to perform operations comprising:
   determining a processor type which is a type of at least one of the one or more computer processors, each processor type associating each said bus bridge with a maximum set of bus identifiers available for use as identifiers of buses accessible via the bus bridge, the maximum set being independent of buses actually present in the computer system and accessible via the bus bridge, wherein for at least one hardware interconnection parameter and the corresponding bus bridge, the associated maximum set of bus identifiers depends on the processor type; and
   creating, in the computer storage, a sequence of software bridges, each software bridge specifying at least part of a programmatic interface for accessing an associated one of the bus bridges, the programmatic interface being dependent on the hardware interconnection between the associated bus bridge and the one or more computer processors, each software bridge specifying the associated set of bus identifiers;
   wherein in the sequence of software bridges, the software bridges are in a sequential order corresponding to an order of the associated maximum sets of bus identifiers which is independent of the processor type, but a corresponding order of the associated hardware interconnection parameters depends on said processor type.

10. The computer system of claim 9, wherein each bus bridge is a PCI (Peripheral Component Interconnect) root bridge.

11. The computer system of claim 9, wherein the computer system is configured to repeatedly:
(i) receive a bus identifier, and
(ii) search the computer storage for the corresponding software bridge whose associated set of bus identifiers includes the bus identifier received in the corresponding operation (i);
wherein at least one instance of operation (ii) comprises matching the corresponding received bus identifier against one or more bus identifier sets specified by one or more software bridges; and
wherein at least one other instance of operation (ii) does not match the corresponding received bus identifier against any bus identifier set specified by any software bridge, but determines the corresponding software bridge from the corresponding received bus identifier defining a position of the corresponding software bridge in said sequence.

12. The computer system of claim 9, wherein the computer system is configured to repeatedly:
(i) receive a bus identifier, and
(ii) search the computer storage for the corresponding software bridge whose associated set of bus identifiers includes the bus identifier received in the corresponding operation (i);
wherein at least one instance of operation (ii) determines the corresponding software bridge using the corresponding received bus identifier defining a position of the corresponding software bridge in said sequence; and
wherein at least one other instance of operation (ii) determines the corresponding software bridge by traversing the software bridges to match the corresponding received bus identifier against the bus identifier set of each software bridge traversed until the bus identifier set includes the corresponding received bus identifier.

13. The computer system of claim 9, wherein the sets of bus identifiers do not overlap.

14. The computer system of claim 9, wherein each set of bus identifiers is a range of integers.

15. The computer system of claim 9, wherein the sequential order of the software bridges corresponds to an increasing or decreasing order of addresses in the computer storage.

16. The computer system of claim 9, wherein the sequential order of the software bridges is an order of the software bridges in a linked list of the software bridges.

17. The computer system of claim 9, wherein the computer system comprises a software procedure which, upon receipt of an input comprising a bus identifier, returns an identifier of a software bus bridge specifying the associated set to which the bus identifier belongs.

18. A non-transitory computer readable medium comprising one or more computer instructions operable to configure a computer system comprising one or more computer processors, a computer storage, and a plurality of bus bridges corresponding to hardware interconnection parameters defined, for each bus bridge, by hardware interconnection between the bus bridge and the one or more computer processors, the computer readable medium being operable to configure the computer system to:
determine a processor type which is a type of at least one of the one or more computer processors, each processor type associating each said bus bridge with a maximum set of bus identifiers available for use as identifiers of buses accessible via the bus bridge, the maximum set being independent of buses actually present in the computer system and accessible via the bus bridge, wherein for at least one hardware interconnection parameter and the corresponding bus bridge, the associated maximum set of bus identifiers depends on the processor type; and
create, in the computer storage, a sequence of software bridges, each software bridge specifying at least part of a programmatic interface for accessing an associated one of the bus bridges, the programmatic interface being dependent on the hardware interconnection between the associated bus bridge and the one or more computer processors, each software bridge specifying the associated set of bus identifiers;
wherein in the sequence of software bridges, the software bridges are in a sequential order corresponding to an order of the associated maximum sets of bus identifiers which is independent of the processor type, but a corresponding order of the associated hardware interconnection parameters depends on said processor type.

19. The non-transitory computer readable medium of claim 18, wherein each bus bridge is a PCI (Peripheral Component Interconnect) root bridge.

20. The non-transitory computer readable medium of claim 18, wherein the computer instructions are operable to configure the computer system to repeatedly:
(i) receive a bus identifier, and
(ii) search the computer storage for the corresponding software bridge whose associated set of bus identifiers includes the bus identifier received in the corresponding operation (i);
wherein at least one instance of operation (ii) comprises matching the corresponding received bus identifier against one or more bus identifier sets specified by one or more software bridges; and
wherein at least one other instance of operation (ii) does not match the corresponding received bus identifier against any bus identifier set specified by any software bridge, but determines the corresponding software bridge from the corresponding received bus identifier defining a position of the corresponding software bridge in said sequence.

\* \* \* \* \*